(12) United States Patent
Beppu et al.

(10) Patent No.: US 6,190,789 B1
(45) Date of Patent: Feb. 20, 2001

(54) SLIDE MEMBER

(75) Inventors: Masaaki Beppu; Eiji Hirai; Seiki Mori, all of Tokyo (JP)

(73) Assignee: Nihon Parkerizing Co., Ltd., Tokyo (JP)

( * ) Notice: Under 35 U.S.C. 154(b), the term of this patent shall be extended for 0 days.

(21) Appl. No.: 09/178,607

(22) Filed: Oct. 26, 1998

(30) Foreign Application Priority Data

Oct. 27, 1997 (JP) .................................................... 9-293068

(51) Int. Cl.[7] .............................. B32B 15/00; B32B 15/01
(52) U.S. Cl. ........................ 428/680; 428/634; 428/679; 428/680; 428/935; 205/109; 205/273; 205/274
(58) Field of Search .................................... 428/634, 679, 428/680, 935; 205/109, 273, 274

(56) References Cited

U.S. PATENT DOCUMENTS

| | | | | |
|---|---|---|---|---|
| 4,619,345 | * | 10/1986 | Rands | ..................................... 184/109 |
| 4,808,275 | * | 2/1989 | Ohzoraa et al. | ........................ 204/16 |
| 5,024,900 | * | 6/1991 | Kuruma et al. | ....................... 428/626 |
| 5,516,213 | * | 5/1996 | Moriyama et al. | .................... 384/292 |
| 5,595,639 | * | 1/1997 | Sano et al. | ............................ 205/109 |

FOREIGN PATENT DOCUMENTS

| | | | |
|---|---|---|---|
| 53083938 | * | 7/1978 | (JP) . |
| 07102383 | * | 4/1995 | (JP) . |

* cited by examiner

Primary Examiner—Deborah Jones
Assistant Examiner—Lymarie Miranda
(74) Attorney, Agent, or Firm—Pillsbury Madison & Sutro LLP

(57) ABSTRACT

A slide member having a highly lubricative and highly abrasion-resistant plating layer formed on the sliding surface thereof. The plating layer contains fine particles of graphite selected from flake graphite, vein graphite and/or amorphous graphite in its metallic matrix. The plating layer has a hardness of not less than 550 in terms of Hv and is produced by using a plating solution containing naphthalene sulfanate of formalin condensate as surface active agent. The matrix is preferable to be a Ni—P type metallic matrix and the dispersed fine particles of graphite are preferable having a size of 0.1 to 20 μm and are contained by 0.1 to 10 wt % relative to the matrix.

2 Claims, 1 Drawing Sheet

SLIDE MEMBER

TECHNICAL FIELD

This invention relates to a highly lubricative and highly abrasion-resistant slide member.

BACKGROUND ART

Japanese Patent Application Laid Open No. 53-83938 describes a plating layer of metal comprising a nickel-phosphor matrix and lubricative fine particles dispersed in the matrix. It also describes sericite and graphite as examples of lubricative fine particles. However, it does not describe any process for producing a plating solution which contains dispersed fine graphite particles.

Japanese Patent Application Laid Open No. 7-102383 describes a nonelectrolytic plating layer of Ni—P metal containing dispersed fine particles. It also describes polytetrafluoroethylene, graphite and molybdenum disulphide as examples of dispersed fine particles. However, it does not describe any practical process for producing the plating solution which contains dispersed fine graphite particles.

Generally, fine particles of graphite are in a form of soot, that simply floats on the surface of a solution and would not be dispersed in the plating solution. While not described in Japanese Patent Applications as explained above, fine particles of graphite can be dispersed into plating solution by using a surface active agent. However, according to the knowledge of the present inventors, plating solution containing usual surface active agent generates a big internal stress in the plating layer, and arises the resultant problem of interlayer exfoliation of the plating layer.

The inventors of the present invention had filed a patent application in Japan on a novel process of forming a Ni plating layer on Sep. 3,1997. According to this prior invention of the present inventors, special composite paticles in which Ni particles are placed on a surface of the graphite particle are previously produced. The special composite particle are added to the plating solution containing Ni, instead of adding usual graphite particles.

With this process, a plating solution containing dispersed fine particles of graphite can be obtained without using a surface active agent. These special composite particles can easily become suspended and dispersed in the plating solution containing Ni, since Ni particles are placed on the surface of the graphite particle. Thus the central particles of graphite are dispersed well into the plating solution by way of the surface particles of Ni without using any surface active agent. The plating layer is free from the problem of interlayer exfoliation.

The plating layer formed by using the solution containing special composite particles is highly lubricative due to the dispersed fine graphite particles. However, it is insufficient in its abrasion-resistant property.

FIG. 1 is a graph made by the present inventors obtained by experiments in which each solution has an identical Ni—P content. According to the findings of the present inventors, the Ni—P plating layer formed by using the solution containing special composite particles softens the matrix and increases the abrasion of the plating layer compared with a Ni—P plating layer formed by using a solution containing dispersed fine particle of BN. In other words, when special composite particles are used, the matrix of the plating layer apt to contain less P so that its final P content remains low to make it difficult to produce a sufficiently hard matrix.

As described above, without special means, fine particles of graphite can hardly be dispersed into a plating solution. They may be dispersed well into a plating solution by using an ordinary surface active agent,then there arises a problem of interlayer exfoliation. On the other hand, they may be dispersed well into a plating solution without using a surface active agent when a plating solution contains special composite particles, then there arises a problem of poorly abrasion-resistant matrix.

It is, therefore, an object of the present invention to provide a sliding member having a plating layer that contains dispersed fine particles of graphite but free from the problem of interlayer separation and the plating layer is sufficiently abrasion-resistant.

DISCLOSURE OF INVENTION

According to the invention, the above object is achieved by providing a slide member characterized in that the slide member has a plating layer on the sliding surface thereof, the plating layer contains dispersed fine particles of graphite selected from flake graphite, vein graphite and /or amorphous graphite in its metallic matrix, the metallic matrix has a hardness of not less than 550 in terms of Hv and the plating layer is produced by using a plating solution containing naphthalene sulfonate of formalin condensate as surface active agent.

Preferably, the metalic matrix is a Ni—P metallic matrix and the size of dispersed fine particles of graphite are 0.1 to 20 $\mu$m and the amount of dispersed fine particles of graphite are 0.1 to 10 wt % relative to the matrix.

BEST MODE FOR CARRYING OUT THE INVENTION

Figure 1:
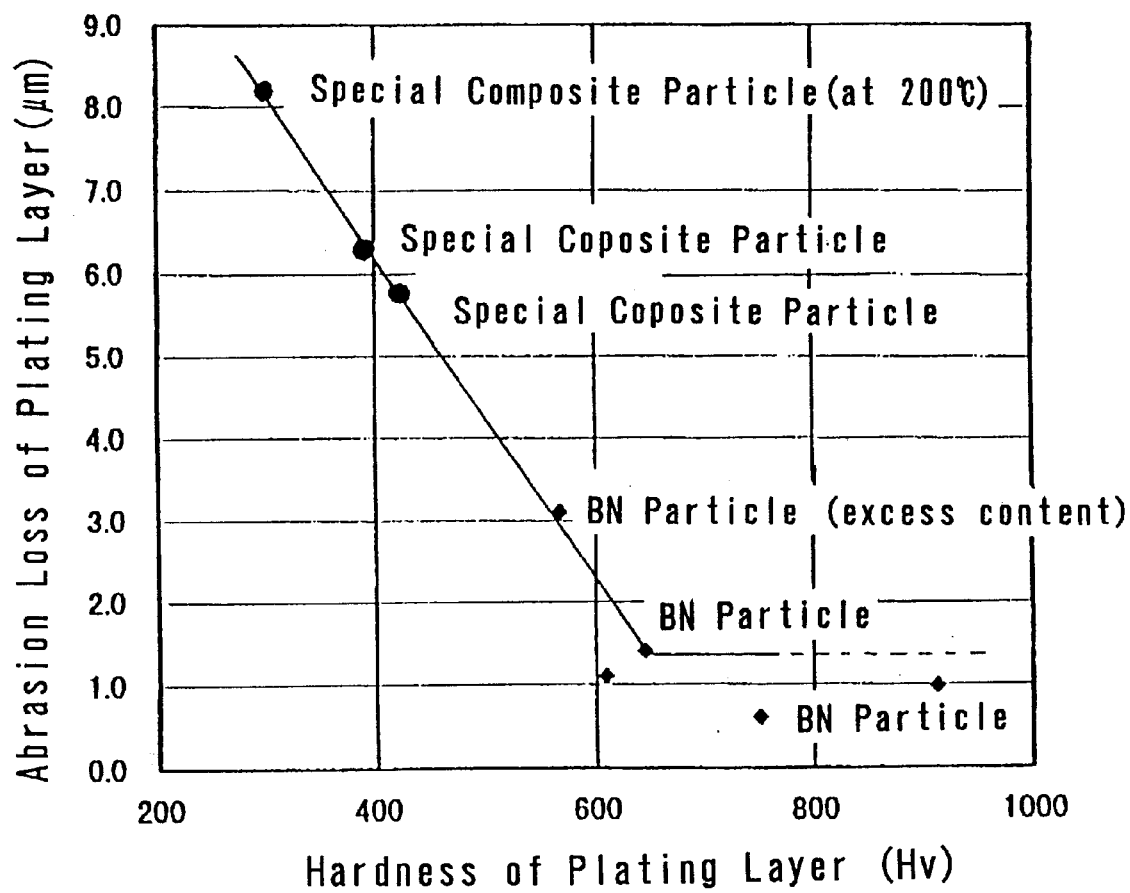
FIG. 1 is a graph showing the relationship between the hardness of a plating layer and the abrasion of the plating layer.

According to the present invention, a plating layer is formed by using a plating solution containing naphthalene sulfonate of formalin condensate as surface active agent.

As explained above,fine particles of graphite do not disperse into a plating solution when the plating solution contains no surface active agent . When an ordinary surface active agent is used, while fine particles of graphite may disperse into the plating solution, the produced plating layer can give rise to a trouble of interlayer exfoliation.

Naphthalene sulfonate of formalin condensate has been used for dispersing a cement. However, there is no report on using it as surface active agent in a plating solution. Nor is it known to date to use it to disperse fine particles of graphite.

Table 1 shows the composition of a base solution used by the present invention for a Ni—P plating solution. In Table 1, nickel sulfamate operates as Ni source for the plating layer, Nickel chloride operates as agent for dissolving the anode and boric acid operates as pH buffer. Saccharin soda is used as leveler. Hypophosphorous acid is used to supply P to the plating layer.

TABLE 1

| | |
|---|---|
| 60% Nickel Sulfamate | 800 g/L |
| Nickel Chlorid | 15 g/L |
| Baric Acid | 45 g/L |
| Saccharin Soda | 5 g/L |
| 50% Hypophosphorous Acid | 0.6 g/L |

The inventors produced plating solutions of Nos. 1 through 4 in Table 2 by adding 0.1~5 cc/L of different surface active agent respectively to the base solution of Table 1. Also, 50 g/L of fine flake graphite powder of 3 μm was added to each plating solution of Table 2.

In Table 2, No. 1 is the surface active agent according to the present invention and Nos. 2 through 4 are surface active agent usually used in plating solutions. It is apparent that naphthalene sulfonate of formalin condensate of No. 1 according to the invention operates by far more remarkably to disperse fine particles of graphite than usual surface active agent of Nos. 2, 3 and 4.

TABLE 2

| | surface active agent | amount cc/L | dispersion * |
|---|---|---|---|
| 1 | Naphthalene Sulfonate of Formalin Codensate | 0.1 ~ 5 | ⊚ |
| 2 | Polymer Anion of Carboxylate | 0.1 ~ 5 | ○ |
| 3 | Polymer Cation of Amine | 0.1 ~ 5 | ○ |
| 4 | Polyoxyethylene alkylphenylether | 0.1 ~ 5 | ○ |

⊚ : very highly dispersed
○ : dispersed

Inventors had formed 7 different plating layers by using plating solutions as shown in Table 3. Nos. 1 through 3 in Table 3 are plating solutions according to the invention prepared by adding naphthalene sulfonate of formalin condensate by 3 cc/liter to the base solution of Table 1. No. 4 in Table 3 represents a comparative example where very fine particles of carbon black were used. Nos. 5 and 6 in Table 3 represent comparative examples where fine particles are those of SiC and those of BN. No. 7 is a comparative example using special composite particles where Ni particles are placed on the surface of flake graphite particle.

No. 4 contains naphthalene sulfonate of formalin condensate by 3 liter. In No. 5 and 7, no surface active agent are added. in No. 6, popular surface active agent for dispersing BN was added.

Fine particles were dispersed by 50 g/liter in each of the plating solutions of Nos. 1 through 7 in Table 3.

The specimens used in the experiments for forming a plating layer thereon were plates of an aluminum alloy (A2024P) having an area of 75 mm×50 mm.

TABLE 3

| | Fine particles | average dia. of fine particles | surface active agent | amount of fine particle |
|---|---|---|---|---|
| 1 | Flake Graphite | 10 μm | No. 1 in Table 2 | 50 g/L |
| 2 | Vein Graphite | 5 μm | " | 50 g/L |
| 3 | Amorphous Graphite | 3 μm | " | 50 g/L |
| 4 | Carbon Black | 22 nm | " | 50 g/L |
| 5 | SiC | 2 ~ 3 μm | not used | 50 g/L |
| 6 | BN | 6 ~ 7 μm | ✗ | 50 g/L |
| 7 | Special Composite Particle | 12 μm | not used | 50 g/L |

✗: conventional surfactant usually used for BN.

Prior to the experiments, all the specimens were subjected to the same sequential processing steps of degreasing→etching→treatment with an acidic solution→Zn substitution→treatment with nitric acid solution→Zn substitution, so that they were treated by Zn substitution plating twice. During the plating operation, the plating solution was agitated by air bubbling of 20 to 40 $Nm^3/hr/m^3$ and a plate layer was formed on the surface of each of the specimens to a thickness of 30 to 50 μm by means of electrolytic plating of (5 $A/dm^2$×5 min)+(15 $A/dm^2$×about 35 min).

Table 4 is the result obtained by experiments for forming a plating layer on the respective plates. In order to check the presence or absence of interlayer exfoliation, each of the specimens was examined by enlarging a longitudinal cross section by ×100.

Nos. 1 through 4 prepared by using the surface active agent according to the invention showed no interlayer exfoliation and they have a highly adherent plating layer. The surface roughness of each of the specimens was determined by means of a surface roughness/profile tester (Surfcom 575B:Tokyo Seimitsu Co.) and it was found that the specimens of Nos. 1 through 3 in Table 4 according to the invention had a very smooth surface.

TABLE 4

| | fine particles | interlayer exfoliation | surface roughness | | |
|---|---|---|---|---|---|
| | | | Ra (μm) | Rz (μm) | Rmax (μm) |
| 1 | Flake Graphite | not observed | X = 0.84 (0.79 ~ 0.88) | X = 5.52 (4.71 ~ 6.21) | X = 7.76 (6.92 ~ 8.81) |
| 2 | Vein Graphite | " | X = 0.76 (0.72 ~ 0.81) | X = 4.37 (4.03 ~ 5.76) | x = 7.09 (6.14 ~ 8.33) |
| 3 | Amorphous G. | " | X = 0.72 (0.64 ~ 0.80) | X = 4.79 (3.97 ~ 5.70) | X = 6.98 (6.08 ~ 8.11) |
| 4 | Carbon Black | " | X = 1.6 (1.5 ~ 1.7) | X = 10.7 (9.9 ~ 11.5) | X = 12.6 (12.2 ~ 13..5) |
| 5 | SiC | " | X = 0.54 (0.51 ~ 0.58) | X = 4.32 (3.78 ~ 5.01) | X = 5.47 (4.88 ~ 6.52) |
| 6 | BN | " | X = 0.30 (0.29 ~ 0.32) | X = 2.13 (1.99 ~ 2.36) | X = 2.72 (2.16 ~ 3.60) |
| 7 | Special Composite P. | " | X = 1.2 (1.1 ~ 1.3) | X = 8.6 (7.8 ~ 8.9) | X = 10.2 (9.6 ~ 11.0) |

X: mean value

Then, the inventors of the present invention conducted a friction/abrasion test by Bowden-Leben friction apparatus on the plating layer of each of the specimens. The surface of specimens were finished in #100. Counter slide member was SUJ 2 steel having 5 mm in diameter with a load of 5 kgf, and move for 200 times over a sliding distance of 10 mm at a speed of 10 mm/sec. The coefficient of friction of each of the specimens was measured by conducting twice sliding tests using lubricating oil and twice sliding tests without using lubricating oil. The lubricating oil used for the test was a 0.5 cc of engine oil (5W–30).

Table 5 shows the coefficients of friction of the specimens obtained by using lubricating oil. As seen from Table 5, in case where lubricating oil is used, the coeffcients of friction of the plating layers of Nos. 1 through 4 are smaller than those of the plating layers of No. 5 and 6 containing fine particles of SiC and BN to prove that the former are more lubricative.

TABLE 5

Coefficient of Friction with Lubricating Oil
※ 1: start, 100: at 100 times, 200: at 200 times

| | | 1st test ※ | | | 2nd test ※ | | |
|---|---|---|---|---|---|---|---|
| | Fine particles | 1 | 100 | 200 | 1 | 100 | 200 |
| 1 | Flake Graphite | 0.08 | 0.06 | 0.07 | 0.08 | 0.07 | 0.07 |
| 2 | Vein graphite | 0.06 | 0.07 | 0.06 | 0.08 | 0.06 | 0.08 |
| 3 | Amorphous G. | 0.07 | 0.06 | 0.06 | 0.08 | 0.06 | 0.07 |
| 4 | Carbon Black | 0.08 | 0.06 | 0.06 | 0.08 | 0.06 | 0.06 |
| 5 | SiC | 0.12 | 0.18 | 0.12 | 0.14 | 0.12 | 0.13 |
| 6 | BN | 0.15 | 0.13 | 0.12 | 0.15 | 0.13 | 0.13 |
| 7 | Special Composite P. | 0.09 | 0.06 | 0.06 | 0.09 | 0.07 | 0.06 |

Table 6 shows the coefficients of friction of the specimens obtained without using lubricating oil. While the specimen No. 4 containing carbon black shows a small coefficient of friction in Table 5, it shows a large value in case of no lubricating oil as shown in Table 6. Both the specimens Nos. 5 and 6 containing SiC and BN respectively shows a large coefficient of friction regardless if lubricating oil was used or not as seen from Tables 5 and 6. On the other hand, all the specimens of Nos. 1,2 and 3 according to the invention showed a small coefficient of friction regardless when lubricating oil was used or not and proved to be highly lubricative in both cases of with or without lubricating oil.

TABLE 6

Coefficient of Friction without Lubricating Oil
※ 1: start, 100: at 100 times, 200: at 200 times

| | | 1st test ※ | | | 2nd test ※ | | |
|---|---|---|---|---|---|---|---|
| | Fine particles | 1 | 100 | 200 | 1 | 100 | 200 |
| 1 | Flake Graphite | 0.08 | 0.10 | 0.12 | 0.08 | 0.09 | 0.11 |
| 2 | Vein Graphite | 0.07 | 0.10 | 0.11 | 0.08 | 0.10 | 0.12 |
| 3 | Amorphous G. | 0.08 | 0.09 | 0.10 | 0.07 | 0.09 | 0.10 |
| 4 | Carbon Black | 0.10 | 0.23 | 0.25 | 0.09 | >0.25 | >0.25 |
| 5 | SiC | 0.11 | >0.25 | >0.25 | 0.11 | >0.25 | >0.25 |
| 6 | BN | 0.09 | 0.18 | 0.23 | 0.10 | 0.16 | 0.22 |
| 7 | Special Composite P. | 0.10 | 0.13 | 0.14 | 0.10 | 0.14 | 0.13 |

The inventors then measured the thickness loss by abrasion on each specimens being obtained after 200 times sliding. Table 7 shows the result. While the specimen No. 4 containing carbon black showed little abrasion when used with lubricating oil, it was abraded remarkably when used without lubricating oil. The specimens Nos. 5 and 6 containing SiC and BN respectively were also abraded greatly in case of no lubricating oil. The specimen No. 7 containing special composite particles had small coefficients of friction as shown in Tables 5 and 6, however, its thickness loss by abrasion was large as seen from Table 7. On the other hand, all the specimens of Nos. 1 through 3 prepared according to the invention were abraded only slightly regardless when lubricating oil was used or not.

TABLE 7

| | | Thickness loss by abrasion (μm.) | |
|---|---|---|---|
| | Fine particle | With Lubricating Oil | Without Lubricating Oil |
| 1 | Flake Graphite | 4.5 ~ 5.5 | 4.5 ~ 5.6 |
| 2 | Vein Graphite | 4.0 ~ 5.5 | 4.5 ~ 5.5 |

TABLE 7-continued

| | | Thickness loss by abrasion (μm.) | |
|---|---|---|---|
| | Fine particle | With Lubricating Oil | Without Lubricating Oil |
| 3 | Amorphous G. | 4.5 ~ 5.0 | 5.0 ~ 5.5 |
| 4 | Carbon Black | 5.0 ~ 6.5 | 9.0 ~ 11.5 |
| 5 | SiC | 3.5 ~ 4.5 | 8.0 ~ 9.0 |
| 6 | BN | 6.5 ~ 7.5 | 7.5 ~ 9.5 |
| 7 | Special Composite P. | 8.0 ~ 9.0 | 11.0 ~ 14.0 |

As pointed out above by referring to FIG. 1, plating layers formed by using plating solutions containing special composite particles are advantageous from the viewpoint of small coefficient of friction. They soften the metallic matrix of the plating layer and hence increase the abrasion loss as proved by No. 7 in Table 7

TABLE 8

Hardness (Hv 0.05)

| | fine particle | Hardness on cross section |
|---|---|---|
| 1 | Flake Graphite | X = 634 (614 ~ 642) |
| 2 | Vein Graphite | X = 642 (621 ~ 656) |
| 3 | Amorphous G. | X = 628 (604 ~ 632) |
| 4 | Carbon Black | X = 640 (633 ~ 649) |
| 5 | SiC | X = 638 (625 ~ 646) |
| 6 | BN | X = 618 (604 ~ 636) |
| 7 | Special Composite P. | X = 343 (332 ~ 355) |

Table 8 shows the hardness of the plating layer of the specimens obtained as a result of above experiment s. As seen from Table 8, the specimen No. 7 containing special composite particles showed a very softened hardness of 343 in terms of Hv. On the other hand, all the specimens of Nos. 1 through 3 prepared according to the invention showed a hardness of more than 600 to prove that they are sufficiently hard.

It is understood that a hardness of matrix of more than 550 in terms of Hv is preferable far a slide member of wide use, and the slide member having a plating layer formed by using the plating solution of the invention is preferable for this wide use, since its plating layer has a hardness of more than 550 in terms of Hv.

As described above in Table 4, no interlayer exboloniat occurs in the plating layer produced by using a plating solution according to the invention which contains naphthalene sulfonate of formal in condensate as surface active agent. For the purpose of comparison, the inventors of the present invention prepared plating solutions by adding the surface active agents of Nos. 2, 3, and 4 in Table 2 by 3 cc/liter and fine particles of flake graphite by 50 g/liter to the base solution of Table 1.

Then, specimens were treated to form a plating layer in a manner as described above by using these plating solutions of comparison and the specimens was examined by enlarging their longitudinal cross section by ×100 to check for presence or absence of interlayer exfoliation. And it was found that the use of any of the surface active agents of Nos. 2, 3 and 4 in Table 2 are not preferable since they may give rise to interlayer exfoliation in their plating layers.

While fine particles of graphite having a particles size of 3 to 10 μm were explained as an example, fine particles of graphite having a particle size of 0.1 to 20 μm may have the same effect as in the case of 3 to 10 mm. Additionally, while 60% nickle sulfamate solution containing 50 g/L of fine particles were explained as an example of the invention, plating layer containing 0.1~10 wt % of dispersed graphite have the same preferable effect as explained above.

In another series of experiments, the inventors used carbon steel plates (S45C) as specimens and formed a plating layer of about 100 μm thickness over its surface by using the plating solution of No. 1 in table 3, and obtained their coefficient of friction and abrasion loss by means of the same way as above, and found that they were also very suitable as a slide member.

Advantages of the Invention

As described above, according to the invention, it is now possible to manufacture on an industrial scale slide members having a plating layer of highly lubricative and highly abrasion-resistant that is free from interlayer extoliation.

What is claimed is:

1. A slide member having a highly lubricative and highly abrasion-resistant plating layer formed on the sliding surface thereof comprising:

a sliding member having a sliding surface, said sliding surface being plated with a plating layer comprising a Ni—P metallic matrix of a hardness of not less than 550 Hv, said metallic matrix comprising 0.1 to 10 wt. %, relative to the metallic matrix, of fine particles of graphite selected from the group consisting of flake graphite, vein graphite, amorphous graphite, or mixtures thereof, said particles having a size of 0.1 to 20 μm, wherein said plating layer is formed in a plating solution containing naphthalene sulfonate of formalin condensate as active surface agent.

2. A method of producing the slide member as claimed in claim 1, comprising:

providing a slide member having a sliding surface;

plating said sliding surface in a plating solution comprising naphthalene sulfonate of formalin condensate as active surface agent to form a sliding member having a sliding surface with a plating layer comprising a Ni—P metallic matrix of a hardness of not less than 550 Hv, said metallic matrix comprising 0.1 to 10 wt. %, relative to the metallic matrix, of fine particles of graphite selected from the group consisting of flake graphite, vein graphite, amorphous graphite, or mixtures thereof, said particles having a size of 0.1 to 20 μm.

* * * * *